United States Patent
Johnson

(10) Patent No.: US 12,126,063 B2
(45) Date of Patent: Oct. 22, 2024

(54) ANODE EXHAUST PROCESSING FOR MOLTEN CARBONATE FUEL CELLS

(71) Applicant: ExxonMobil Technology and Engineering Company, Annandale, NJ (US)

(72) Inventor: Gregory R. Johnson, Annandale, NJ (US)

(73) Assignee: EXXONMOBIL TECHNOLOGY AND ENGINEERING COMPANY, Spring, TX (US)

(*) Notice: Subject to any disclaimer, the term of this patent is extended or adjusted under 35 U.S.C. 154(b) by 922 days.

(21) Appl. No.: 16/738,519

(22) Filed: Jan. 9, 2020

(65) Prior Publication Data

US 2020/0176795 A1 Jun. 4, 2020

Related U.S. Application Data

(60) Provisional application No. 62/773,492, filed on Nov. 30, 2018.

(51) Int. Cl.
*H01M 8/04791* (2016.01)
*F02C 6/00* (2006.01)
(Continued)

(52) U.S. Cl.
CPC ..... *H01M 8/04805* (2013.01); *H01M 8/0668* (2013.01); *H01M 2008/147* (2013.01); *H01M 2250/402* (2013.01); *H01M 2250/405* (2013.01)

(58) Field of Classification Search
CPC ..... H01M 2008/147; H01M 2250/402; H01M 2250/405; H01M 8/04805; H01M 8/0668
See application file for complete search history.

(56) References Cited

U.S. PATENT DOCUMENTS

| 5,447,024 A | 9/1995 | Ishida et al. |
| 7,767,191 B2 | 8/2010 | Thomas et al. |

(Continued)

FOREIGN PATENT DOCUMENTS

WO 2020/113242 A1 6/2020

OTHER PUBLICATIONS

Campanari, "Using MCFC for high efficiency CO2 capture from natural gas combined cycles: Comparison of internal and external reforming", Applied Energy vol. 112, p. 772-783 (Year: 2013).*
(Continued)

*Primary Examiner* — Brian R Ohara
*Assistant Examiner* — Brent C Thomas
(74) *Attorney, Agent, or Firm* — Shook, Hardy & Bacon L.L.P.

(57) ABSTRACT

Systems and methods are provided for integrating a chemical looping combustion system with molten carbonate fuel cells to provide improved operation of the molten carbonate fuel cells when using the exhaust from a gas turbine or other electrical power generation device as the $CO_2$ source for the MCFC cathodes. This integration can be accomplished by using metal oxide in the chemical looping combustion system to oxidize the anode output flow from the MCFCs. This can reduce or minimize the number of separations that need to be performed in order to process the concentrated $CO_2$ present within the anode exhaust. By reducing, minimizing, or eliminating the CO and $H_2$ in the anode exhaust, the need to perform more costly separations (such as cryogenic separation or amine washing) to obtain a high purity $CO_2$ product stream can be reduced or minimized. Optionally, the cathode exhaust from the molten carbonate fuel cells can be used as an oxygen-containing stream for regeneration of the metal oxide.

15 Claims, 6 Drawing Sheets

(51) Int. Cl.
*H01M 8/0668* (2016.01)
*H01M 8/14* (2006.01)

(56) References Cited

U.S. PATENT DOCUMENTS

| | | |
|---|---|---|
| 11,211,621 B2 | 12/2021 | Barckholtz et al. |
| 11,424,469 B2 | 8/2022 | Rosen et al. |
| 11,476,486 B2 | 10/2022 | Blanco et al. |
| 2002/0155037 A1* | 10/2002 | Otsuka .............. H01M 8/04089 423/653 |
| 2005/0037245 A1* | 2/2005 | Pham .................. H01M 8/0618 429/495 |
| 2012/0214106 A1* | 8/2012 | Sit ........................... F23C 10/01 431/7 |
| 2017/0141421 A1 | 5/2017 | Sundaram et al. |
| 2017/0271701 A1* | 9/2017 | Berlowitz ............. H01M 8/249 |
| 2020/0176700 A1 | 6/2020 | Fusella et al. |
| 2020/0176783 A1 | 6/2020 | Rosen et al. |
| 2020/0176784 A1 | 6/2020 | Hilmi et al. |
| 2020/0176787 A1 | 6/2020 | Geary et al. |
| 2020/0176789 A1 | 6/2020 | Hilmi et al. |
| 2020/0352535 A1 | 11/2020 | Proksa et al. |

OTHER PUBLICATIONS

Damen, K. et al., (2006) "A comparison of electricity and hydrogen production systems with CO2 capture and storage. Part A: Review and selection of promising conversion and capture technologies", Progress in energy and combustion science, vol. 32, No. 2, pp. 215-246.

International Preliminary Report on Patentability received for PCT Application No. PCT/US2020/012895, mailed on Jun. 10, 2021, 7 Pages.

International Search Report and Written Opinion received for PCT Application No. PCT/US2020/012895, mailed on May 14, 2020, 14 Pages.

* cited by examiner

ANODE EXHAUST PROCESSING FOR MOLTEN CARBONATE FUEL CELLS

CROSS-REFERENCE TO RELATED APPLICATIONS

This application claims priority to U.S. Provisional Application No. 62/773,492 filed Nov. 30, 2018, which is herein incorporated by reference in its entirety.

FIELD

Systems and methods are provided for redox processing of anode exhaust streams from molten carbonate fuel cells for stream purification and/or energy storage.

BACKGROUND

Molten carbonate fuel cells utilize hydrogen and/or other fuels to generate electricity. The hydrogen may be provided by reforming methane or other reformable fuels in a steam reformer, such as steam reformer located upstream of the fuel cell or integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbonaceous materials that can be reacted with steam and/or oxygen at elevated temperature and/or pressure to produce a gaseous product that comprises hydrogen.

The basic structure of a molten carbonate fuel cell includes a cathode, an anode, and a matrix between the cathode and anode that includes one or more molten carbonate salts that serve as the electrolyte. During conventional operation of a molten carbonate fuel cell, the molten carbonate salts partially diffuse into the pores of the cathode. This diffusion of the molten carbonate salts into the pores of the cathode provides an interface region where $CO_2$ can be converted into $CO_3^{2-}$ for transport across the electrolyte to the anode.

During operation, $CO_2$ and $O_2$ are introduced into the cathode of a molten carbonate fuel cell, while hydrogen and/or fuel is passed into the anode. Electrical power is generated by forming carbonate ions at the cathode/electrolyte interface, transporting the ions across the electrolyte, and converting the carbonate ion to a carbon oxide (CO or $CO_2$) in the anode. The anode reaction also results in oxidation of hydrogen to form water. In situations where the cathode feed to a fuel cell represents exhaust from a gas turbine or other power generation device, the molten carbonate fuel cell can provide additional electrical power while also assisting with concentration of $CO_2$ into the anode exhaust of the fuel cell.

For practical reasons, the anode of a molten carbonate fuel cell is typically provided with an excess of hydrogen and/or reformable fuel. As a result, the anode exhaust typically contains a mixture of CO, $CO_2$, $H_2O$, and $H_2$, in addition to any $N_2$ and un-reformed hydrocarbons that may be present. Conventionally, the fuel in the anode exhaust has been used for a variety of purposes. For example, the anode exhaust can be used as a fuel for combustion to form $CO_2$ for the cathode. As another example, the CO and/or $H_2$ can be used as synthesis gas, optionally after separation of the CO and/or $H_2$ from the anode exhaust.

U.S. Pat. No. 5,447,024 describes a chemical looping combustion power generation plant system. The system is described as allowing for fuel to be combusted using a metal oxide as the combustion source for oxygen, as opposed to using air as a source of oxygen. Combustion of the fuel converts a portion of the metal oxide to metal. The metal can then be transferred to a second reactor, where the metal is contacted with air to regenerate the metal oxide. The heat release from both the combustion reaction and the regeneration reaction can be recovered, such as in the form of steam.

U.S. Pat. No. 7,767,191 describes another type of chemical looping reactor system. Instead of regenerating the metal using only oxygen, at least a portion of the metal is converted to metal oxide using water. This results in production of $H_2$. The $H_2$ produced during conversion of metal to metal oxide can then be used as fuel for a fuel cell.

SUMMARY OF THE INVENTION

In an aspect, a method for producing electricity using a molten carbonate fuel cell comprising an anode and a cathode is provided. The method can include operating the molten carbonate fuel cell with a cathode input stream comprising $CO_2$ and $O_2$ to generate i) electricity at a current density of 60 mA/cm$^2$ or more, ii) an anode exhaust comprising $H_2$, CO, and $CO_2$, and iii) a cathode exhaust comprising 2.0 vol % or less $CO_2$, 1.0 vol % or more $H_2O$, and 1.0 vol % or more $O_2$. The method can further include oxidizing at least a portion of the $H_2$ and CO in the anode exhaust in the presence of a metal oxide oxidizer. Additionally, the method can include oxidizing at least a portion of the $H_2$ and CO in the anode exhaust in the presence of a metal oxide oxidizer.

In another aspect, a combined cycle power system is provided. The system can include a gas turbine comprising a combustion zone, and a turbine outlet. The system can further include a plurality of molten carbonate fuel cells comprising fuel cell cathodes, fuel cell anodes, a cathode exhaust outlet, and an anode exhaust outlet. The fuel cell cathodes can be in fluid communication with the combustion zone via the turbine outlet. The system can further include a plurality of chemical looping combustion reactors including one or more first reactors comprising metal oxide particles and one or more second reactors comprising reduced oxidation state metal oxide particles, metal particles, or a combination thereof. At least one first reactor can be in fluid communication with the anode exhaust outlet. The system can further include a heat recovery steam generator in fluid communication with at least one second reactor.

DETAILED DESCRIPTION

Overview

Figure 1:
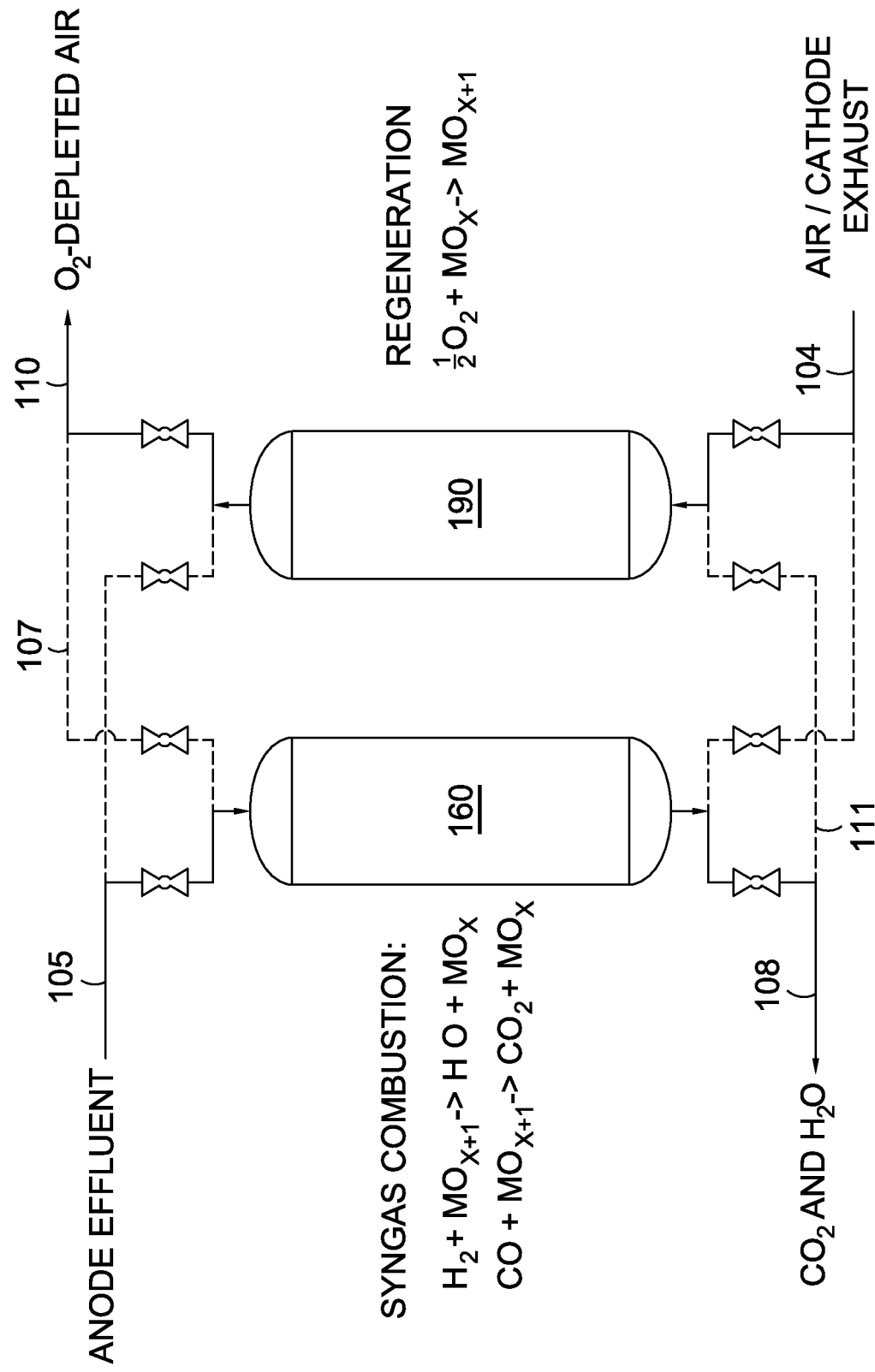
FIG. 1 shows an example of a chemical looping reactor.

In various aspects, systems and methods are provided for integrating a chemical looping combustion system with molten carbonate fuel cells (MCFCs) to provide improved operation of the MCFCs when using the exhaust from a gas turbine (or other electrical power generation device) as the $CO_2$ source for the MCFC cathodes. This integration can be accomplished by using metal oxide in the chemical looping combustion system to oxidize the anode output flow from the MCFCs. The chemical looping combustion system can convert substantially all CO and $H_2$ in the anode exhaust stream to form $CO_2$ and $H_2O$. This can reduce or minimize the number of separations that need to be performed in order to process the concentrated $CO_2$ present within the anode exhaust. In particular. $H_2O$ can be readily separated from $CO_2$ at ambient conditions. By reducing, minimizing, or eliminating the CO and $H_2$ in the anode exhaust, the need to perform more costly separations (such as cryogenic separation or amine washing) to obtain a high purity $CO_2$ product stream can be reduced or minimized.

Optionally, the integration can further include using the cathode exhaust stream from the MCFCs as an oxygen-containing input stream for the chemical looping combustion system. The oxidation of the $H_2$ and CO in the anode exhaust will result in conversion of metal oxide particles in the chemical looping combustion system to a state where the metal is in a lower oxidation state. This can correspond to metal particles and/or metal oxide particles with the metal in a lower oxidation state. Converting the metal and/or reduced oxidation state metal oxide back into the initial metal oxide requires an oxygen-containing stream. The oxygen remaining in the cathode exhaust stream can be used for this oxidation process In some aspects, integration of MCFCs with a chemical looping combustion reactor for processing an anode output stream can be beneficial as a method for generating electricity while also concentrating $CO_2$ for carbon sequestration. During operation of a MCFC, $CO_2$ is fed to the fuel cell cathode inlet is transported across the molten carbonate electrolyte and becomes part of the anode output stream or anode exhaust. In various aspects, the concentration of $CO_2$ in the cathode input stream can be lower than the resulting $CO_2$ concentration in the anode exhaust, so that operation of the fuel cell results in transfer of $CO_2$ from a lower concentration stream to a higher concentration stream. However, the anode output stream typically still includes other components. For example, an anode exhaust can correspond to a mixture that includes at least $H_2$, CO, $H_2O$, and $CO_2$. An example of potential values for these components of an anode exhaust (excluding any other components that may be present) is 10 mol % $H_2$, 10 mol % CO, 50 mol % $H_2O$, and 30 mol % $CO_2$.

In order to perform long-term sequestration of the $CO_2$ in geological formations, the $CO_2$ needs to be purified to >95 mol % $CO_2$. Thus, to perform sequestration on the $CO_2$ from an anode output stream, the $CO_2$ needs to be separated from the $H_2$, CO, and $H_2O$ that are typically present in an anode exhaust. In various aspects, combining a chemical looping combustion reactor with a molten carbonate fuel cell can facilitate formation of a sufficiently pure $CO_2$ stream to be suitable for sequestration. By using a chemical looping reactor to oxidize the $H_2$ and CO in an exhaust, the $CO_2$ from the anode exhaust can be concentrated to a desired value without needing to compress $H_2$ and CO and/or without needing to bring the gases to sub-ambient temperatures in order to condense $CO_2$. Instead, after oxidation of the $H_2$ and CO, the primary components remaining in an oxidized anode exhaust will be $H_2O$ and $CO_2$. These two components can be readily separated to form a high purity $CO_2$-containing stream at ambient pressure and/or temperature.

Purifying an anode output stream (i.e., anode exhaust) using chemical looping combustion can be in contrast to conventional separation methods. For example, one option for further concentrating a conventional anode output stream can be knocking-out the $H_2O$, compressing the gas, and then cooling the compressed gas to sub-ambient temperatures so that the $CO_2$ liquifies. This conventional process train for forming a $CO_2$ stream adds a considerable number of unit operations to the process, which makes the overall process complexity quite high. The equipment footprint required to accommodate the separation equipment is also non-trivial. Most applications of the MCFC technology are envisioned to be focused on power generation (i.e., $H_2$ not exported as a product stream), which means that the $H_2$ will be burned to generate heat. The equipment required to obtain a concentrated $H_2$ stream can constitute a sizeable capital investment. Additionally, roughly 5% or more of the electricity generated by molten carbonate fuel cells can be lost due to parasitic energy losses associated with compressing the syngas and cooling the refrigerant. By contrast, using chemical looping combustion to process an anode exhaust can avoid these energy losses. Additionally, the chemical looping combustion reactors can correspond to a simpler set of equipment than a gas separation plant.

An alternative approach for forming a concentrated $CO_2$ stream from an anode exhaust can be to perform conventional combustion of the syngas in the anode exhaust prior to any separation unit operations. For example, an anode output stream can be passed into a reactor with a stoichiometric amount of air in the presence of an oxidation catalyst. In such a configuration, the syngas will oxidize to $H_2O$ and $CO_2$, but by using air as the $O_2$ source, $N_2$ is mixed into the resulting to oxidized output stream. This necessitates adding a $N_2$—$CO_2$ separation step to meet the purity specification for sequestration. The addition of $N_2$ can be avoided by carrying out air separation first to derive a pure $O_2$ stream to be used as the oxidant, but this strategy only trades a $N_2$—$CO_2$ separation step for a $N_2$—$O_2$ separation step.

In addition to enabling production of a high quality $CO_2$ product stream, integration of a chemical looping combustion system with MCFCs can assist a power generation site in performing load following. Molten carbonate fuel cells typically operate more efficiently when the fuel cells can operate continuously at normal operating conditions. Unfortunately, commercial power generation generally does not operate under conditions where the amount of power generated is constant. Instead, power generation sites typically operate under load following conditions, wherein the amount of power generated varies depending on the amount of consumer demand. This can present difficulties when the variation in load is relatively large. Conventionally, this can lead to one of several design choices with a less desirable outcome. One option can be to select the size and number of the MCFCs based on a typical operating load. In this option, when a demand surge occurs and extra turbine capacity is required, the $CO_2$ from the additional turbines is not processed in an MCFC, resulting in additional $CO_2$ emissions. Another option can be to select the size and number of the MCFCs based on the maximum load. While this can provide $CO_2$ sequestration under peak demand conditions, the MCFCs may be required to operate outside of desired parameters under normal conditions and/or a substantial portion of the MCFCs will be under-utilized for significant portions of the day.

Integrating molten carbonate fuel cells with a chemical looping combustion system can reduce or minimize the difficulties associated with processing all of the $CO_2$-containing exhaust from turbines for electrical power generation while also operating the MCFCs within a desired operating window. In various aspects, the turbines and MCFCs can be operated at steady state conditions, while using the chemical looping combustion reactors to perform load following. In such aspects, the size and number of the MCFCs can be selected to match the maximum output of the gas turbines. Small variations in turbine load can be performed, but primarily the turbines are operated at a relatively constant output, resulting in a relatively constant generation of turbine exhaust as a cathode input stream for the MCFCs. However, the net amount of electricity generated can be varied based on the use of the anode exhaust stream from the MCFCs. When the electrical demand is below a threshold value, the primary operation in the chemical looping reaction system is oxidation of the anode exhaust to convert metal oxide to a reduced state (either metal or reduced oxidation state metal oxide). The resulting metal/reduced metal oxide can then be stored for later use. When electrical demand is above a threshold value, the stored metal/reduced metal oxide can be oxidized in the second half of the chemical looping combustion reactor to generate heat for production of steam. The steam can then be used to generate additional electricity. Optionally, during high demand periods, the anode exhaust from the MCFCs can be used to operate a hydrogen turbine, as opposed to being oxidized to generate additional metal/reduced metal oxide.

Additional flexibility can be provided by the chemical looping combustion system based on the fuel utilization of the MCFCs. In particular, if the MCFC is operated at a lower fuel utilization at constant current density, the amount of $H_2$ and/or CO in the anode exhaust can be increased, resulting in a corresponding increase in the amount of metal oxide that can be converted to a reduced state. When reserves of metal/reduced metal oxide are low, lower fuel utilizations can be used for the MCFCs in order to accumulate additional reserves of metal/reduced metal oxide for oxidation. When sufficient oxidized metal is available, higher fuel utilizations can be used for the MCFCs in order to reduce or minimize the amount of additional metal/reduced metal oxide accumulation.

The structures and methods described herein can optionally be used when operating a MCFC to have enhanced $CO_2$ utilization. One difficulty in using MCFCs for elevated $CO_2$ capture is that the operation of the fuel cell can potentially be kinetically limited if one or more of the reactants required for fuel cell operation is present in low quantities. For example, when using a cathode input stream with a $CO_2$ content of 4.0 vol % or less, achieving a $CO_2$ utilization of 75% or more corresponds to a cathode outlet concentration of 1.0 vol % or less. However, a cathode outlet concentration of 1.0 vol % or less does not necessarily mean that the $CO_2$ is evenly distributed throughout the cathode. Instead, the concentration will typically vary within the cathode due to a variety of factors, such as the flow patterns in the anode and the cathode. The variations in $CO_2$ concentration can result in portions of the cathode where $CO_2$ concentrations substantially below 1.0 vol % are present.

Conventional operating conditions for molten carbonate fuel cells typically correspond to conditions where the amount of alternative ion transport is reduced, minimized, or non-existent. The amount of alternative ion transport can be quantified based on the transference for a fuel cell. The transference is defined as the fraction of ions transported across the molten carbonate electrolyte that correspond to carbonate ions, as opposed to hydroxide ions and/or other ions. A convenient way to determine the transference can be based on comparing a) the measured change in $CO_2$ concentration at the cathode inlet versus the cathode outlet with b) the amount of carbonate ion transport required to achieve the current density being produced by the fuel cell. It is noted that this definition for the transference assumes that back-transport of $CO_2$ from the anode to the cathode is minimal. It is believed that such back-transport is minimal for the operating conditions described herein. For the $CO_2$ concentrations, the cathode input stream and/or cathode output stream can be sampled, with the sample diverted to a gas chromatograph for determination of the $CO_2$ content. The average current density for the fuel cell can be measured in any convenient manner.

Under conventional operating conditions, the transference can be relatively close to 1.0, such as 0.98 or more and/or such as having substantially no alternative ion transport. A transference of 0.98 or more means that 98% or more of the ionic charge transported across the electrolyte corresponds to carbonate ions. It is noted that hydroxide ions have a charge of −1 while carbonate ions have a charge of −2, so two hydroxide ions need to be transported across the electrolyte to result in the same charge transfer as transport of one carbonate ion.

In contrast to conventional operating conditions, operating a molten carbonate fuel cell with transference of 0.95 or less can increase the effective amount of carbonate ion transport that is achieved, even though a portion of the current density generated by the fuel cell is due to transport of ions other than carbonate ions. In order to operate a fuel cell with a transference of 0.95 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

One of the advantages of transport of alternative ions across the electrolyte is that the fuel cell can continue to operate, even though a sufficient number of $CO_2$ molecules are not kinetically available. This can allow additional $CO_2$ to be transferred from cathode to anode even though the amount of $CO_2$ present in the cathode would conventionally be considered insufficient for normal fuel cell operation. This can allow the fuel cell to operate with a measured $CO_2$ utilization closer to 100%, while the calculated $CO_2$ utilization (based on current density) can be at least 5% greater than the measured $CO_2$ utilization, or at least 10% greater, or at least 20% greater. It is noted that alternative ion transport can allow a fuel cell to operate with a current density that would correspond to more than 100% calculated $CO_2$ utilization.

Although transport of alternative ions can allow a fuel cell to maintain a target current density, it has further been discovered that transport of alternative ions across the electrolyte can also reduce or minimize the lifetime of a molten carbonate fuel cell. Thus, mitigation of this loss in fuel cell lifetime is desirable. It has been unexpectedly discovered that increasing the open area of the cathode surface and/or decreasing the average cathode gas lateral diffusion length can reduce or minimize the amount of alternative ion transport while performing elevated $CO_2$ capture.

In some aspects, elevated $CO_2$ capture can be defined based on the amount of transference, such as a transference of 0.95 or less, or 0.93 or less, or 0.90 or less. Maintaining an operating condition with transference of 0.95 or less can typically also result in a $CO_2$ concentration in the cathode output stream of 2.0 vol % or less, or 1.5 vol % or less, or 1.0 vol % or less. At higher $CO_2$ concentrations in the cathode output stream, there is typically not sufficient local depletion of $CO_2$ to result in lower transference values.

The presence of elevated $CO_2$ capture can also be indicated by other factors, although such other factors are by themselves typically not a sufficient condition to indicate elevated $CO_2$ capture. For example, when using a lower $CO_2$ concentration cathode input stream, elevated $CO_2$ capture can in some aspects correspond to a $CO_2$ utilization of 70% or more, or 75% or more, or 80% or more, such as up to 95% or possibly still higher. Examples of lower concentration sources of $CO_2$ can correspond to $CO_2$ sources that result in cathode input streams containing 5.0 vol % or less of $CO_2$, or 4.0 vol % or less, such as down to 1.5 vol % or possibly lower. The exhaust from a natural gas turbine is an example of a $CO_2$-containing stream that often has a $CO_2$ content of 5.0 vol % or less of $CO_2$, or 4.0 vol % or less. Additionally or alternately, elevated $CO_2$ capture can correspond to operating conditions where the molten carbonate fuel cell is used to generate a substantial amount of current density, such as 60 $mA/cm^2$ or more, or 80 $mA/cm^2$ or more, or 100 $mA/cm^2$ or more, or 120 $mA/cm^2$ or more, or 150 $mA/cm^2$ or more, or 200 $mA/cm^2$ or more, such as up to 300 $mA/cm^2$ or possibly still higher. It is noted that alternative ion transport can also be indicated by a reduced operating voltage for a fuel cell, as the reaction pathway for alternative ion transport has a lower theoretical voltage than the reaction pathway that uses carbonate ions.

Conventionally, the $CO_2$ concentration in the cathode exhaust of a molten carbonate fuel cell is maintained at a relatively high value, such as 5 vol % $CO_2$ or more, or 10 vol % $CO_2$ or more, or possibly still higher. Additionally, molten carbonate fuel cells are typically operated at $CO_2$ utilization values of 70% or less. When either of these conditions are present, the dominant mechanism for transport of charge across the molten carbonate electrolyte is transport of carbonate ions. While it is possible that transport of alternative ions (such as hydroxide ions) across the electrolyte occurs under such conventional conditions, the amount of alternative ion transport is de minimis, corresponding to 2% or less of the current density (or equivalently, a transference of 0.98 or more).

As an alternative to describing operating conditions in terms of transference, the operating conditions can be described based on measured $CO_2$ utilization and "calculated" $CO_2$ utilization based on average current density. In this discussion, the measured $CO_2$ utilization corresponds to the amount of $CO_2$ that is removed from the cathode input stream. This can be determined, for example, by using gas chromatography to determine the $CO_2$ concentration in the cathode input stream and the cathode output stream. This can also be referred to as the actual $CO_2$ utilization, or simply as the $CO_2$ utilization. In this discussion, the calculated $CO_2$ utilization is defined as the $CO_2$ utilization that would occur if all of the current density generated by the fuel cell was generated based on transport of $CO_3^{2-}$ ions across the electrolyte (i.e., transport of ions based on $CO_2$). The difference in measured $CO_2$ utilization and the calculated $CO_2$ utilization can be used individually to characterize the amount of alternative ion transport and/or these values can be used to calculate the transference, as described above.

In some aspects, any convenient type of electrolyte suitable for operation of a molten carbonate fuel cell can be used. Many conventional MCFCs use a eutectic carbonate mixture as the carbonate electrolyte, such as a eutectic mixture of 62 mol % lithium carbonate and 38 mol % potassium carbonate (62% $Li_2CO_3$/38% $K_2CO_3$) or a eutectic mixture of 52 mol % lithium carbonate and 48 mol % sodium carbonate (52% $Li_2CO_3$/48% $Na_2CO_3$). Other eutectic mixtures are also available, such as a eutectic mixture of 40 mol % lithium carbonate and 60 mol % potassium carbonate (40% $Li_2CO_3$/60% $K_2CO_3$). While eutectic mixtures of carbonate can be convenient as an electrolyte for various reasons, non-eutectic mixtures of carbonates can also be suitable. Generally, such non-eutectic mixtures can include various combinations of lithium carbonate, sodium carbonate, and/or potassium carbonate. Optionally, lesser amounts of other metal carbonates can be included in the electrolyte as additives, such as other alkali carbonates (rubidium carbonate, cesium carbonate), or other types of metal carbonates such as barium carbonate, bismuth carbonate, lanthanum carbonate, or tantalum carbonate.

Chemical Looping Combustion Configuration

Performing chemical looping combustion generally requires at least two reactors. One reactor (or a first plurality of reactors) can correspond to a reactor where metal oxide is being used as an oxidant for oxidation (combustion) of a fuel, such as the $H_2$ and CO in an anode exhaust stream. A second reactor (or a second plurality of reactors) can correspond to a reactor where metal/reduced metal oxide is oxidized for conversion back to the higher oxidation state version of the metal oxide.

The reactors for performing combustion and for performing metal oxidation can be organized in any convenient manner. In some aspects, fixed bed reactors can be used. In such aspects, the metal and/or metal oxide particles do not move, and the identity of the reactor is dependent on the current state of the metal and/or metal oxide particles. If the particles within the fixed bed(s) correspond to the higher oxidation state metal oxide particles, then the fixed bed reactor is ready for performing fuel combustion using the oxygen from the metal oxide as the oxidant. If the particles within the fixed bed(s) correspond to particles of metal/reduced oxidation state metal oxide, then the fixed bed reactor is ready for performing metal oxidation. If particles in both the higher and lower oxidation states are present, then the fixed bed reactor can potentially be used for either fuel combustion or metal oxidation. In this type of aspect, appropriate gas flows for performing fuel combustion and/or metal oxidation can be directed to a given fixed bed reactor. Such gas flows can be controlled using appropriate piping, valves, manifolds, and/or other gas flow structures.

Another option can be to transport particles between reactors, so that a given reactor is dedicated to performing either fuel combustion or metal oxidation. In this type of aspect, the reactors can correspond to fluidized bed reactors, moving bed reactors, and/or other reactors that are suitable for transport of particles into and out of the reactors during operation. This type of configuration can simplify the piping for transport of fuel and/or oxidant to the reactors, but such a configuration does require transport of the solid particles between reactors. In still other aspects, any convenient set of reactors can be used that can facilitate the chemical looping combustion reactions.

In some aspects, a large plurality of fixed bed reactors can be available, so that after conversion of metal oxide to metal, one or more of the plurality of reactors can be stored for a period of time. Alternatively, in aspects where fluidized bed reactors are used, a substantial amount of particle storage can be available for storage of particles that have been converted from metal oxide to a metallic state. Such stored particles, either in a fixed bed or fluidized bed system, can be used as a stored source of energy. It is noted that such energy storage could optionally be performed in a chemical looping combustion system that is not paired with molten carbonate fuel cells.

The metal oxide system used in the chemical looping reactor can correspond to any convenient metal oxide that can facilitate oxidation of fuel by reducing the oxidation state of the particles, followed by oxidation of the particles to regenerate the initial metal oxide. Examples of suitable metal oxides include, but are not limited to, oxides of iron, manganese, nickel and copper. The chemical looping reactors can be operated at temperatures of 400° C.-1250° C. (or 400° C. to 800° C., or 800° C. to 1250° C.) and pressures of 100 kPa-a to 2500 kPa-a in order to facilitate the various oxidation/reduction reactions. In some aspects, the metal oxide can be selected based on selecting a metal oxide that can provide nearly complete combustion of the syngas components to $CO_2$ and $H_2O$ at the looping reactor temperature. In some aspects, the metal oxide can be selected based on selecting a metal oxide where the reduction and/or regeneration steps can be performed at a temperature similar to the temperature of the fuel cell effluent. In other words, the metal oxide can be selected so that the amount of additional heating/cooling of the fuel cell effluent prior to reduction and/or regeneration is reduced or minimized.

FIG. 1 shows an overview of a chemical looping combustion process. In FIG. 1, for convenience in illustrating operation, a single reactor 160 for fuel combustion/metal oxide reduction is shown along with a single reactor 190 for oxidation to regenerate the metal oxide. Of course, any convenient number of reactors 160 or reactors 190 could be used.

In the overview configuration shown in FIG. 1, a fuel input stream 105 is introduced into reactor 160. Conventionally, various types of hydrocarbon streams have been used as fuel input stream 105. The anode exhaust from a molten carbonate fuel cell, which includes $H_2$, CO, and optionally additional hydrocarbons, is another suitable example of a fuel input stream 105. In aspects where an anode exhaust is used as fuel input stream 105, the "syngas combustion" equations shown in FIG. 1 can occur within reactor 160, resulting in conversion of $H_2$, CO, and metal oxide to form $H_2O$, $CO_2$, and metal/reduced oxidation state metal oxide. The $CO_2$ and $H_2O$ can leave reactor as oxidized stream 108. Either simultaneously or at different times, an oxidant input stream 104 can be introduced into reactor 190. Air is an example of a suitable oxidant input stream. Another example is a cathode exhaust stream from a molten carbonate fuel cell. Introducing an oxygen-containing stream into reactor 190 allows the "regeneration" equation shown in FIG. 1 to occur within reactor 190, resulting in regeneration of the initial metal oxide. Any remaining portions of oxidant input stream 104, such as nitrogen present in air, can leave reactor 190 as an oxygen-depleted stream 110.

Using a cathode exhaust stream to provide oxygen for the regeneration reaction can potentially provide one or more benefits. In some aspects, a cathode exhaust stream can have a lower $O_2$ concentration than air. For example, air can typically have an $O_2$ content of 20 vol % or more. A cathode exhaust stream can provide an oxygen-containing stream with an $O_2$ content of 1.0 vol % to 18 vol %, or 1.0 vol % to 15 vol %, or 5.0 vol % to 15 vol %, or 1.0 vol % to 10 vol %, or 5.0 vol % to 10 vol %. Having a lower oxygen concentration in the regenerating reactor can mitigate the reactor exotherm that occurs during regeneration of the metal to metal oxide. Additionally or alternately, the cathode exhaust stream can typically exit from the fuel cell at a temperature of 500° C. to 700° C., or 520° C. to 650° C. This can be similar to the temperature for performing regeneration and/or closer to the regeneration temperature than air at room temperature. As a result, using a cathode exhaust stream can reduce or minimize the amount of heating of the oxygen-containing stream in order to perform regeneration.

In aspects where reactor 160 and reactor 190 correspond to fixed bed reactors, the flows into reactor 160 and reactor 190 can be changed as needed. For example, after sufficient metal oxide has been converted to a reduced state in reactor 160, valves can be used so that the input stream for reactor 160 corresponds to oxidant input stream 104, with oxygen-depleted stream 107 being generated as a result. Similarly, after sufficient reduced state metal and/or metal oxide has been converted into the initial metal oxide in reactor 190, valves can be used so that the input stream for reactor 190 corresponds to fuel input stream 105, with oxidized stream 111 being generated as a result.

Figure 2:
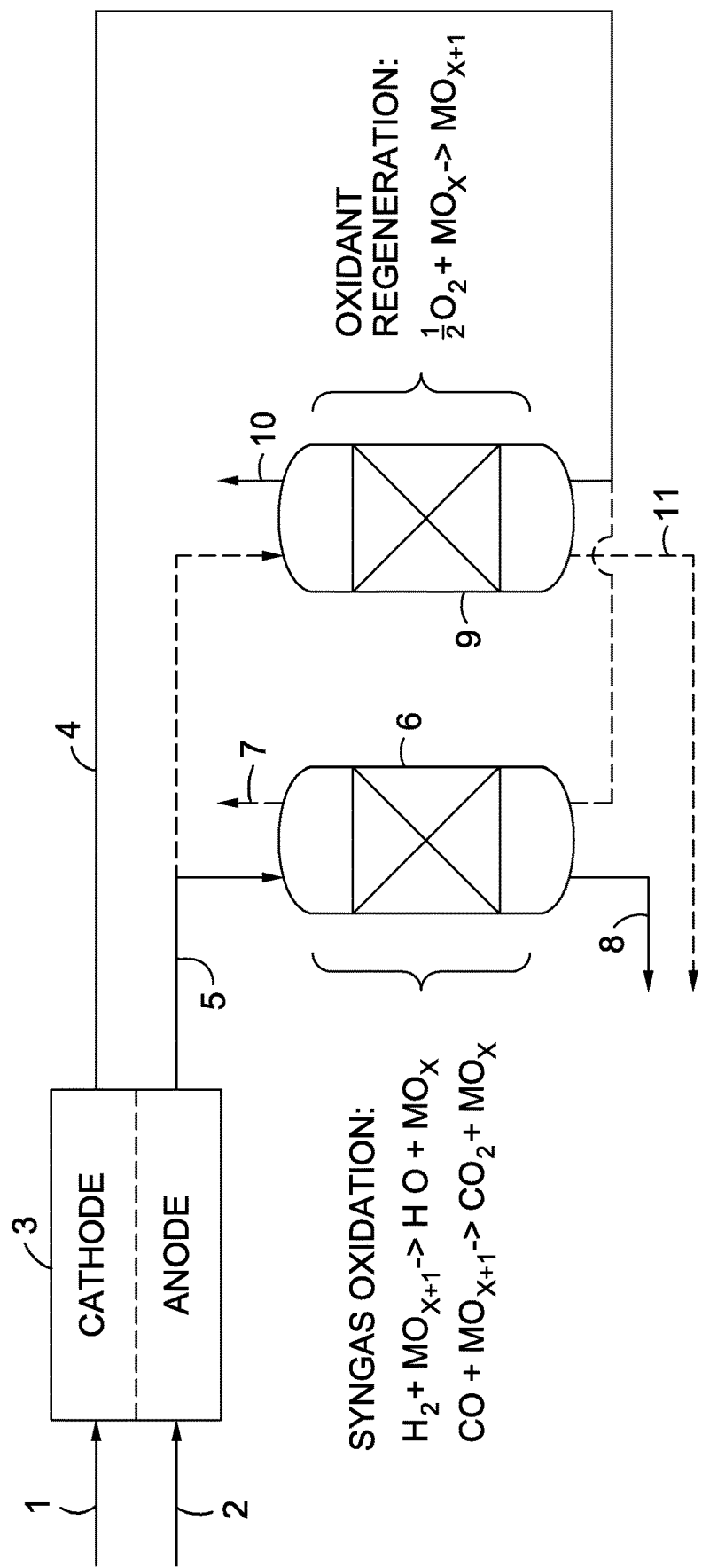
FIG. 2 shows an example of integration of a molten carbonate fuel cell with a chemical looping reactor.

FIG. 2 shows an example of integration of chemical looping reactors with a molten carbonate fuel cell. In FIG. 2, only a single fuel cell and a single set of reactors are shown, but it is understood that any convenient number of molten carbonate fuel cells can be integrated with any convenient number of reactors in a similar manner. In FIG. 2, fuel cell 3 corresponds to a molten carbonate fuel cell. The cathode of fuel cell 3 receives a cathode input stream 1 that includes $CO_2$ and $O_2$. An example of a suitable cathode input stream can be a stream based on the exhaust from a natural gas turbine, where the $CO_2$ content can be 8.0 vol % or less, or 5.0 vol % or less, or 4.0 vol % or less. The anode of fuel cell 3 receives an anode input stream 2 that can include $H_2$ and/or a fuel that can be reformed to form $H_2$, such as methane. During operation, the fuel cell 3 generates electricity (not shown), an anode output stream 5, and a cathode output stream 4. The anode output stream 5 can include $H_2$, CO, $CO_2$, $H_2O$, and optionally unreacted hydrocarbon or other reformable fuel. The anode output stream 5 can also optionally include components that are not directly involved in the molten carbonate fuel cell reaction, such as $N_2$ or other diluents. The cathode output stream can include $CO_2$, $O_2$, and optionally other components present in the source streams for the cathode input stream. For example, if the cathode input stream includes combustion exhaust from a gas turbine, some $H_2O$ may be present. If additional air is added to the cathode input to provide the desired $O_2$ content, $N_2$ and/or other components of air may be present.

The anode output stream 5 is passed into first reactor 6, where the $H_2$, CO, and or unreacted reformable fuel in the anode output stream 5 are oxidized to form additional $H_2O$ and $CO_2$. This also results in reducing of metal oxide in first reactor 6. Reactor 6 generates an output stream 8 that contains $H_2O$ and $CO_2$, which includes the additional $H_2O$ and $CO_2$ formed by oxidation.

In the configuration shown in FIG. 2, the cathode output stream 4 from the fuel cell 3 can also be used as part of the chemical looping combustion process. The cathode output stream 4 can be passed into second reactor 9. The oxygen in cathode output stream 4 can be used to perform oxidant regeneration (conversion of reduced state metal/metal oxide to the initial metal oxide). This results in generation of a second output stream 10 that will typically include any $CO_2$ that is not consumed in the cathode of fuel cell 3 and any $O_2$ that is not consumed in second reactor 9.

Depending on the configuration, either the streams passed into first reactor 6 and second reactor 9 can be periodically changed, or the metal/metal oxide particles can be passed between first reactor 6 and second reactor 9. In the configuration shown in FIG. 2, first reactor 6 and second reactor 9 are shown as fixed bed reactors. As a result, after performing syngas oxidation in first reactor 6 and oxidant regeneration in second reactor 9 for a period of time, the flow pattern can be changed so that the anode output stream 5 is passed into second reactor 9 and the cathode output stream 4 is passed into first reactor 6. This results in generation of an oxidant regeneration output stream 7 from first reactor 6 and an oxidized anode output stream 11 from second reactor 9. By periodically changing the input streams to first reactor 6 and second reactor 9, the reactors can alternately be used for syngas oxidation and oxidant regeneration.

Figure 5:
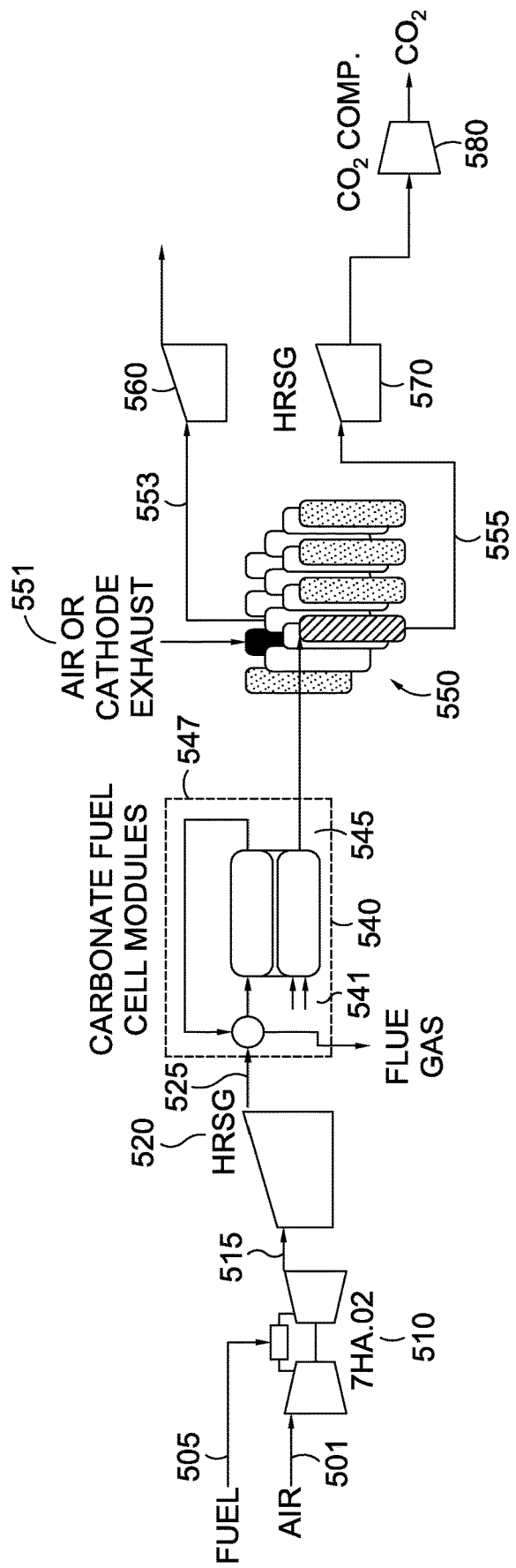
FIG. 5 shows an example of integration of a combined cycle natural gas turbine with molten carbonate fuel cells and chemical looping reactors.

FIG. 5 shows an overview of the full integration of molten carbonate fuel cells and chemical looping combustion reactors with a natural gas turbine for generation of electrical power. In the configuration shown in FIG. 5, turbine fuel 505 and air 501 are delivered to a natural gas turbine 510 (or other type of turbine) for generation of electric power. The turbine exhaust 515 can be passed into a heat recovery steam generator 520 to cool the turbine exhaust 515 to an appropriate temperature for molten carbonate fuel cells 540 by using the heat from turbine exhaust 515 to generate steam. The generated steam can be used for generation of additional electricity, or for any other convenient purpose. The cooled turbine exhaust 525 is then passed into the cathode of molten carbonate fuel cells 540. Optionally, the cooled turbine exhaust 525 can be heat exchanged with cathode exhaust 547 prior to entering the cathodes of molten carbonate fuel cells 540. Additionally, fuel 541 can be passed into the anodes of molten carbonate fuel cells 540. Fuel 541 can correspond to reformable fuel, $H_2$, or a combination thereof.

The anode exhaust 545 from molten carbonate fuel cells 540 can be passed into one or more chemical looping combustion reactors 550. A plurality of reactors 550 can be available. After oxidation in reactor(s) 550, the oxidized anode output stream 555 can be passed into a heat recovery steam generator 570 to generate additional electrical power while cooling the stream, which can facilitate separation of $H_2O$ from the $CO_2$ in the oxidized anode output stream 555. Optionally, the stream containing $H_2O$ and $CO_2$ can then be compressed 580 to assist with separation of any remaining water and/or to prepare the $CO_2$ for subsequent transport.

As the metal oxide in a reactor is substantially converted to a reduced state, the flow of the anode exhaust 545 can be diverted to other reactors. The reactor(s) containing the substantially converted metal/reduced state metal oxide can then be stored until additional generation of electrical power is desired. When additional electrical power generation is desired, an oxidant-containing stream, such as air 551, can be passed into the reactor(s) containing the substantially converted metal/reduced state metal oxide. This can regenerate the metal oxide while producing heat. The heat generated during regeneration of the initial metal oxide can be carried by a gas flow 553 to a heat recovery steam generator 560.

Conditions for Molten Carbonate Fuel Operation with Alternative Ion Transport

In various aspects, the operating conditions for a molten carbonate fuel cell (such as a cell as part of a fuel cell stack) can be selected to correspond to a transference of 0.95 or less, thereby causing the cell to transport both carbonate ion and at least one type of alternative ion across the electrolyte. In addition to transference, operating conditions that can indicate that a molten carbonate fuel cell is operating with transport of alternative ions include, but are not limited to, $CO_2$ concentration for the cathode input stream, the $CO_2$ utilization in the cathode, the current density for the fuel cell, the voltage drop across the cathode, the voltage drop across the anode, and the $O_2$ concentration in the cathode input stream. Additionally, the anode input stream and fuel utilization in the anode can be generally selected to provide the desired current density.

Generally, to cause alternative ion transport, the $CO_2$ concentration in at least a portion of the cathode needs to be sufficiently low while operating the fuel cell to provide a sufficiently high current density. Having a sufficiently low $CO_2$ concentration in the cathode typically corresponds to some combination of a low $CO_2$ concentration in the cathode input flow, a high $CO_2$ utilization, and/or a high average current density. However, such conditions alone are not sufficient to indicate a transference of 0.97 or less, or 0.95 or less.

For example, a molten carbonate fuel cell with a cathode open area of roughly 33% was operated with a $CO_2$ cathode inlet concentration of 19 vol %, 75% $CO_2$ utilization, and 160 mA/cm$^2$ of average current density. These conditions corresponded to a difference between calculated $CO_2$ utilization and measured $CO_2$ utilization of less than 1%. Thus, the presence of substantial alternative ion transport/a transference of 0.97 or less, or 0.95 or less, cannot be inferred simply from the presence of a high $CO_2$ utilization and a high average current density.

As another example, a molten carbonate fuel cell with a cathode open area of between 50% and 60% was operated with a $CO_2$ cathode inlet concentration of 4.0 vol %, 89% CO-utilization, and 100 mA/cm$^2$ of current density. These conditions corresponded to a transference of at least 0.97. Thus, the presence of a transference of 0.95 or less/substantial alternative ion transport cannot be inferred simply from the presence of high $CO_2$ utilization in combination with low $CO_2$ concentration in the cathode input stream.

As still another example, a molten carbonate fuel cell with a cathode open area of between 50% and 60% was operated with a $CO_2$ cathode inlet concentration of 13 vol %, 68% $CO_2$ utilization, and 100 mA/cm$^2$ of current density. These conditions corresponded to a transference of at least 0.98.

In this discussion, operating a MCFC to transport alternative ions across the electrolyte is defined as operating the MCFC so that more than a de minimis amount of alternative ions are transported. It is possible that minor amounts of alternative ions are transported across an MCFC electrolyte under a variety of conventional conditions. Such alternative ion transport under conventional conditions can correspond to a transference of 0.98 or more, which corresponds to transport of alternative ions corresponding to less than 2.0% of the current density for the fuel cell.

In this discussion, operating an MCFC to cause alternative ion transport is defined as operating an MCFC with a transference of 0.95 or less, so that 5.0% or more of the current density (or, 5.0% or more of the calculated $CO_2$ utilization) corresponds to current density based on transport of alternative ions, or 10% or more, or 20% or more, such as up to 35% or possibly still higher.

In this discussion, operating a MCFC to cause substantial alternative ion transport (i.e., to operate with a transference of 0.95 or less) is further defined to correspond to operating an MCFC with voltage drops across the anode and cathode that are suitable for power generation. The total electrochemical potential difference for the reactions in a molten carbonate fuel cell is ~1.04 V. Due to practical considerations, an MCFC is typically operated to generate current at a voltage near 0.7 V or about 0.8 V. This corresponds to a combined voltage drop across the cathode, electrolyte, and anode of roughly 0.34 V. In order to maintain stable operation, the combined voltage drop across the cathode, electrolyte, and anode can be less than ~0.5 V, so that the resulting current generated by the fuel cell is at a voltage of 0.55 V or more, or 0.6 V or more.

With regard to the anode, one condition for operating with substantial alternative ion transport can be to have an $H_2$ concentration of 8.0 vol % or more, or 10 vol % or more in the region where the substantial alternative ion transport occurs. Depending on the aspect, this could correspond to a region near the anode inlet, a region near the cathode outlet, or a combination thereof. Generally, if the Hz concentration in a region of the anode is too low, there will be insufficient driving force to generate substantial alternative ion transport.

Suitable conditions for the anode can also include providing the anode with $H_2$, a reformable fuel, or a combination thereof; and operating with any convenient fuel utilization that generates a desired current density, including fuel utilizations ranging from 20% to 80%. In some aspects this can correspond to a traditional fuel utilization amount, such as a fuel utilization of 60% or more, or 70% or more, such as up to 85% or possibly still higher. In other aspects, this can correspond to a fuel utilization selected to provide an anode output stream with an elevated content of $H_2$ and/or an elevated combined content of $H_2$ and CO (i.e., syngas), such as a fuel utilization of 55% or less, or 50%6 or less, or 40% or less, such as down to 20% or possibly still lower. The $H_2$ content in the anode output stream and/or the combined content of $H_2$ and CO in the anode output stream can be sufficient to allow generation of a desired current density. In some aspects, the $H_2$ content in the anode output stream can be 3.0 vol % or more, or 5.0 vol % or more, or 8.0 vol % or more, such as up to 15 vol % or possibly still higher. Additionally or alternately, the combined amount of $H_2$ and CO in the anode output stream can be 4.0 vol % or more, or 6.0 vol % or more, or 10 vol % or more, such as up to 20 vol % or possibly still higher. Optionally, when the fuel cell is operated with low fuel utilization, the $H_2$ content in the anode output stream can be in a higher range, such as an $H_2$ content of 10 vol % to 25 vol %. In such aspects, the syngas content of the anode output stream can be correspondingly higher, such as a combined $H_2$ and CO content of 15 vol % to 35 vol %. Depending on the aspect, the anode can be operated to increase the amount of electrical energy generated, to increase the amount of chemical energy generated, (i.e., $H_2$ generated by reforming that is available in the anode output stream), or operated using any other convenient strategy that is compatible with operating the fuel cell to cause alternative ion transport.

In addition to having sufficient $H_2$ concentration in the anode, one or more locations within the cathode need to have a low enough $CO_2$ concentration so that the more favorable pathway of carbonate ion transport is not readily available. In some aspects, this can correspond to a having a $CO_2$ concentration in the cathode outlet stream (i.e., cathode exhaust) of 2.0 vol % or less, or 1.0 vol % or less, or 0.8 vol % or less. It is noted that due to variations within the cathode, an average concentration of 2.0 vol % or less (or 1.0 vol % or less, or 0.8 vol % or less) in the cathode exhaust can correspond to a still lower $CO_2$ concentration in localized regions of the cathode. For example, in a cross-flow configuration, at a corner of the fuel cell that is adjacent to the anode inlet and the cathode outlet, the $CO_2$ concentration can be lower than a corner of the same fuel cell that is adjacent to the anode outlet and the cathode outlet. Similar localized variations in $CO_2$ concentration can also occur in fuel cells having a co-current or counter-current configuration.

In addition to having a low concentration of $CO_2$, the localized region of the cathode can also have 1.0 vol % or more of $O_2$, or 2.0 vol % or more. In the fuel cell, $O_2$ is used to form the hydroxide ion that allows for alternative ion transport. If sufficient $O_2$ is not present, the fuel cell will not operate as both the carbonate ion transport and alternative ion transport mechanisms are dependent on $O_2$ availability. With regard to $O_2$ in the cathode input stream, in some aspects this can correspond to an oxygen content of 4.0 vol % to 15 vol %, or 6.0 vol % to 10 vol %.

It has been observed that a sufficient amount of water should also be present for alternative ion transport to occur, such as 1.0 vol % or more, or 2.0 vol % or more. Without being bound by any particular theory, if water is not available in the cathode when attempting to operate with substantial alternative ion transport, the fuel cell appears to degrade at a much more rapid rate than the deactivation rate that is observed due to alternative ion transport with sufficient water available. It is noted that because air is commonly used as an $O_2$ source, and since $H_2O$ is one of the products generated during combustion, a sufficient amount of water is typically available within the cathode.

Due to the non-uniform distribution of cathode gas and/or anode gas during operation of a molten carbonate fuel cell for elevated $CO_2$ capture, it is believed that one or more of the corners and/or edges of the molten carbonate fuel cell will typically have a substantially higher density of alternative ion transport. The one or more corners can correspond to locations where the $CO_2$ concentration in the cathode is lower than average, or a location where the $H_2$ concentration in the anode is greater than average, or a combination thereof.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array. In aspects where a fuel cell stack includes separate reforming elements, it is noted that the anode input flow may first pass through a reforming element prior to entering one or more anodes associated with the reforming element.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". Additional types of elements can also be included in the fuel cell stack, such as reforming elements. This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell". For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

Figure 3:
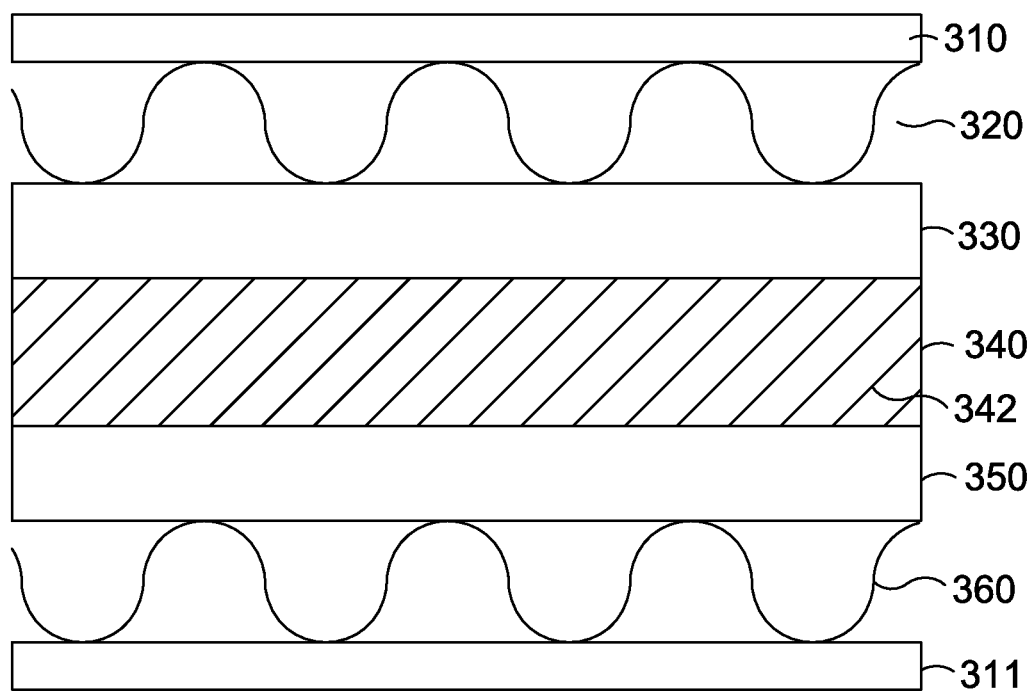
FIG. 3 shows an example of a molten carbonate fuel cell.

Example of Molten Carbonate Fuel Cell Operation:
Cross Flow Orientation for Cathode and Anode FIG. 3 shows a general example of a portion of a molten carbonate fuel cell stack. The portion of the stack shown in FIG. 3 corresponds to a fuel cell 301. In order to isolate the fuel cell from adjacent fuel cells in the stack and/or other elements in the stack, the fuel cell includes separator plates 310 and 311. In FIG. 3, the fuel cell 301 includes an anode 330 and a cathode 350 that are separated by an electrolyte matrix 340 that contains an electrolyte 342. In various aspects, cathode 350 can correspond to a dual-layer (or multi-layer) cathode. Anode collector 320 provides electrical contact between anode 330 and the other anodes in the stack, while cathode collector 360 provides similar electrical contact between cathode 350 and the other cathodes in the fuel cell stack. Additionally anode collector 320 allows for introduction and exhaust of gases from anode 330, while cathode collector 360 allows for introduction and exhaust of gases from cathode 350.

During operation, $CO_2$ is passed into the cathode collector 360 along with $O_2$. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to carbonate ion ($CO_3^{2-}$), which can then be transported across electrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. The $H_2$ and/or a hydrocarbon suitable for forming $H_2$ are introduced into anode 330 via anode collector 320.

The flow direction within the anode of a molten carbonate fuel cell can have any convenient orientation relative to the flow direction within a cathode. One option can be to use a cross-flow configuration, so that the flow direction within the anode is roughly at a 90° angle relative to the flow direction within the cathode. This type of flow configuration can have practical benefits, as using a cross-flow configuration can allow the manifolds and/or piping for the anode inlets/outlets to be located on different sides of a fuel cell stack from the manifolds and/or piping for the cathode inlets/outlets.

Figure 4:
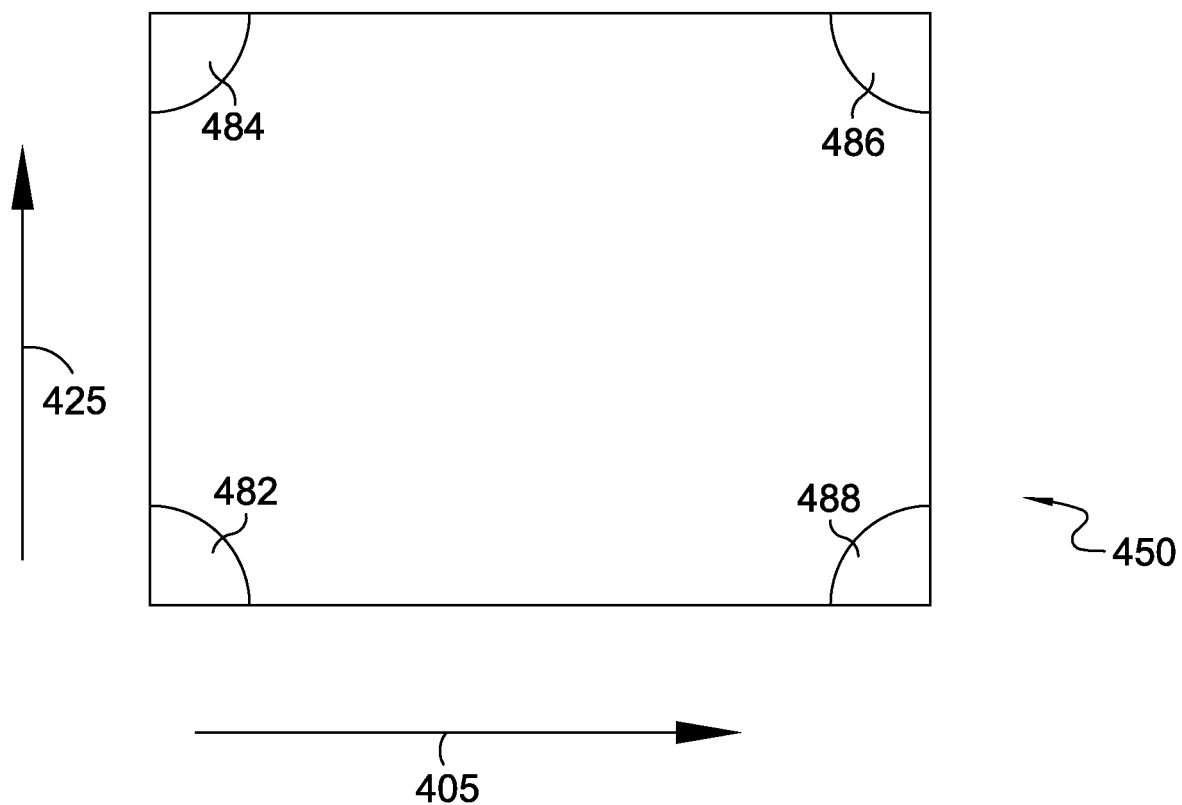
FIG. 4 shows a flow pattern example for a molten carbonate fuel cell with an anode flow direction that is aligned roughly perpendicular to a cathode flow direction.

FIG. 4 schematically shows an example of a top view for a fuel cell cathode, along with arrows indicating the direction of flow within the fuel cell cathode and the corresponding fuel cell anode. In FIG. 4, arrow 405 indicates the direction of flow within cathode 450, while arrow 425 indicates the direction of flow with the anode (not shown).

Because the anode and cathode flows are oriented at roughly 90° relative to each other, the anode and cathode flow patterns can contribute to having different reaction conditions in various parts of the cathode. The different conditions can be illustrated by considering the reaction conditions in the four corners of the cathode. In the illustration in FIG. 4, the reaction conditions described herein are qualitatively similar to the reaction conditions for a fuel cell operating with a $CO_2$ utilization of 75% or more (or 80% or more).

Corner 482 corresponds to a portion of the fuel cell that is close to the entry point for both the cathode input flow and the anode input flow. As a result, the concentration of both $CO_2$ (in the cathode) and $H_2$ (in the anode) is relatively high in corner 482. Based on the high concentrations, it is expected that portions of the fuel cell near corner 482 can operate under expected conditions, with substantially no transport of ions other than carbonate ions across the electrolyte.

Corner 484 corresponds to a portion of the fuel cell that is close to the entry point for the cathode input flow and close to the exit point for the anode output flow. In locations near corner 484, the amount of current density may be limited due to the reduced concentration of $H_2$ in the anode, depending on the fuel utilization. However, sufficient $CO_2$ should be present that any ions transported across the electrolyte substantially correspond to carbonate ions.

Corner 486 corresponds to a portion of the fuel cell that is close to the exit point for the anode output flow and close to the exit point for the cathode output flow. In locations near corner 486, due to the lower concentrations of both $H_2$ (in the anode) and $CO_2$ (in the cathode), little or no current would be expected due to the low driving force for the fuel cell reaction.

Corner 488 corresponds to a portion of the fuel cell that is close to the entry point for the anode input flow and close to the exit point for the cathode output flow. The relatively high availability of hydrogen at locations near corner 488 would be expected to result in substantial current density. However, due to the relatively low concentration of $CO_2$, a substantial amount of transport of hydroxide ions and/or other alternative ions can occur. Depending on the aspect, the substantial amount of alternative ion transport can increase the calculated $CO_2$ utilization by 5% or more, or 10% or more, or 15% or more, or 20% or more. Additionally or alternately, the transference can be 0.95 or less, or 0.90 or less, or 0.85 or less, or 0.80 or less. The transport of substantial amounts of alternative ions across the electrolyte can temporarily allow higher current densities to be maintained at locations near corner 488. However, the transport of alternative ions can also degrade the cathode and/or anode structures, resulting in lower (and possibly no) current density over time at locations near corner 488. It is noted that at lower amounts of alternative ion transport (such as a transference of 0.98 or more), the amount of lifetime degradation is not as severe.

Anode Inputs and Outputs

In various aspects, the anode input stream for a MCFC can include hydrogen, a hydrocarbon such as methane, a hydrocarbonaceous or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbonaceous, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain CO, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternately be suitable for inclusion in an anode input stream, such as light ends ($C_1$-$C_4$) generated during cracking or other refinery processes. Still other suitable refinery streams can additionally or alternately include refinery streams containing CO or $CO_2$ that also contain $H_2$ and/or reformable fuel compounds.

Still other potential sources for an anode input can additionally or alternately include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In various aspects, an MCFC can be operated to cause alternative ion transport across the electrolyte for the fuel cell. In order to cause alternative ion transport, the $CO_2$ content of the cathode input stream can be 5.0 vol % or less, or 4.0 vol % or less, such as 1.5 vol % to 5.0 vol %, or 1.5 vol % to 4.0 vol %, or 2.0 vol % to 5.0 vol %, or 2.0 vol % to 4.0 vol %.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or to alternate sources can include other types of boilers, fired heaters, furnaces, and/or other types of devices that burn carbon-containing fuels in order to heat another substance (such as water or air).

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternatively be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternatively, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C. e.g., with an inlet temperature of about 550° C. and an outlet temperature of about 625° C. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Additional Molten Carbonate Fuel Cell Operating Strategies

In some aspects, when operating a MCFC to cause alternative ion transport, the anode of the fuel cell can be operated at a traditional fuel utilization value of roughly 60% to 80%. When attempting to generate electrical power, operating the anode of the fuel cell at a relatively high fuel utilization can be beneficial for improving electrical efficiency (i.e., electrical energy generated per unit of chemical energy consumed by the fuel cell).

In some aspects, it may be beneficial to reduce the electrical efficiency of the fuel cell in order to provide other benefits, such as an increase in the amount of $H_2$ provided in the anode output flow. This can be beneficial, for example, if it is desirable to consume excess heat generated in the fuel cell (or fuel cell stack) by performing additional reforming and/or performing another endothermic reaction. For example, a molten carbonate fuel cell can be operated to provide increased production of syngas and/or hydrogen. The heat required for performing the endothermic reforming reaction can be provided by the exothermic electrochemical reaction in the anode for electricity generation. Rather than attempting to transport the heat generated by the exothermic fuel cell reaction(s) away from the fuel cell, this excess heat can be used in situ as a heat source for reforming and/or another endothermic reaction. This can result in more efficient use of the heat energy and/or a reduced need for additional external or internal heat exchange. This efficient production and use of heat energy, essentially in-situ, can reduce system complexity and components while maintaining advantageous operating conditions. In some aspects, the amount of reforming or other endothermic reaction can be selected to have an endothermic heat requirement comparable to, or even greater than, the amount of excess heat generated by the exothermic reaction(s) rather than significantly less than the heat requirement typically described in the prior art.

Additionally or alternately, the fuel cell can be operated so that the temperature differential between the anode inlet and the anode outlet can be negative rather than positive. Thus, instead of having a temperature increase between the anode inlet and the anode outlet, a sufficient amount of reforming and/or other endothermic reaction can be performed to cause the output stream from the anode outlet to be cooler than the anode inlet temperature. Further additionally or alternately, additional fuel can be supplied to a heater for the fuel cell and/or an internal reforming stage (or other internal endothermic reaction stage) so that the temperature differential between the anode input and the anode output can be smaller than the expected difference based on the relative demand of the endothermic reaction(s) and the combined exothermic heat generation of the cathode combustion reaction and the anode reaction for generating electrical power. In aspects where reforming is used as the endothermic reaction, operating a fuel cell to reform excess fuel can allow for production of increased synthesis gas and/or increased hydrogen relative to conventional fuel cell operation while minimizing the system complexity for heat exchange and reforming. The additional synthesis gas and/or additional hydrogen can then be used in a variety of applications, including chemical synthesis processes and/or collection/repurposing of hydrogen for use as a "clean" fuel.

The amount of heat generated per mole of hydrogen oxidized by the exothermic reaction at the anode can be substantially larger than the amount of heat consumed per mole of hydrogen generated by the reforming reaction. The net reaction for hydrogen in a molten carbonate fuel cell ($H_2 + \frac{1}{2} O_2 => H_2O$) can have an enthalpy of reaction of about −285 kJ/mol of hydrogen molecules. At least a portion of this energy can be converted to electrical energy within the fuel cell. However, the difference (approximately) between the enthalpy of reaction and the electrical energy produced by the fuel cell can become heat within the fuel cell. This quantity of energy can alternatively be expressed as the current density (current per unit area) for the cell multiplied by the difference between the theoretical maximum voltage of the fuel cell and the actual voltage, or <current density>*

(Vmax−Vact). This quantity of energy is defined as the "waste heat" for a fuel cell. As an example of reforming, the enthalpy of reforming for methane ($CH_4+2H_2O=>4H_2+CO_2$) can be about 250 kJ/mol of methane, or about 62 kJ/mol of hydrogen molecules. From a heat balance standpoint, each hydrogen molecule electrochemically oxidized can generate sufficient heat to generate more than one hydrogen molecule by reforming. In a conventional configuration, this excess heat can result in a substantial temperature difference from anode inlet to anode outlet. Instead of allowing this excess heat to be used for increasing the temperature in the fuel cell, the excess heat can be consumed by performing a matching amount of the reforming reaction. The excess heat generated in the anode can be supplemented with the excess heat generated by the combustion reaction in the fuel cell. More generally, the excess heat can be consumed by performing an endothermic reaction in the fuel cell anode and/or in an endothermic reaction stage heat integrated with the fuel cell.

Depending on the aspect, the amount of reforming and/or other endothermic reaction can be selected relative to the amount of hydrogen reacted in the anode in order to achieve a desired thermal ratio for the fuel cell. As used herein, the "thermal ratio" is defined as the heat produced by exothermic reactions in a fuel cell assembly (including exothermic reactions in both the anode and cathode) divided by the endothermic heat demand of reforming reactions occurring within the fuel cell assembly. Expressed mathematically, the thermal ratio (TH)=$Q_{EX}/Q_{EN}$, where $Q_{EX}$ is the sum of heat produced by exothermic reactions and $Q_{EN}$ is the sum of heat consumed by the endothermic reactions occurring within the fuel cell. Note that the heat produced by the exothermic reactions can correspond to any heat due to reforming reactions, water gas shift reactions, combustion reactions (i.e., oxidation of fuel compounds) in the cathode, and/or the electrochemical reactions in the cell. The heat generated by the electrochemical reactions can be calculated based on the ideal electrochemical potential of the fuel cell reaction across the electrolyte minus the actual output voltage of the fuel cell. For example, the ideal electrochemical potential of the reaction in a MCFC is believed to be about 1.04V based on the net reaction that occurs in the cell. During operation of the MCFC, the cell can typically have an output voltage less than 1.04 V due to various losses. For example, a common output/operating voltage can be about 0.7 V. The heat generated can be equal to the electrochemical potential of the cell (i.e. ~1.04V) minus the operating voltage. For example, the heat produced by the electrochemical reactions in the cell can be ~0.34 V when the output voltage of ~0.7V is attained in the fuel cell. Thus, in this scenario, the electrochemical reactions would produce ~0.7 V of electricity and ~0.34 V of heat energy. In such an example, the ~0.7 V of electrical energy is not included as part of $Q_{EX}$. In other words, heat energy is not electrical energy.

In various aspects, a thermal ratio can be determined for any convenient fuel cell structure, such as a fuel cell stack, an individual fuel cell within a fuel cell stack, a fuel cell stack with an integrated reforming stage, a fuel cell stack with an integrated endothermic reaction stage, or a combination thereof. The thermal ratio may also be calculated for different units within a fuel cell stack, such as an assembly of fuel cells or fuel cell stacks. For example, the thermal ratio may be calculated for a fuel cell (or a plurality of fuel cells) within a fuel cell stack along with integrated reforming stages and/or integrated endothermic reaction stage elements in sufficiently close proximity to the fuel cell(s) to be integrated from a heat integration standpoint.

From a heat integration standpoint, a characteristic width in a fuel cell stack can be the height of an individual fuel cell stack element. It is noted that the separate reforming stage and/or a separate endothermic reaction stage could have a different height in the stack than a fuel cell. In such a scenario, the height of a fuel cell element can be used as the characteristic height. In this discussion, an integrated endothermic reaction stage can be defined as a stage heat integrated with one or more fuel cells, so that the integrated endothermic reaction stage can use the heat from the fuel cells as a heat source for reforming. Such an integrated endothermic reaction stage can be defined as being positioned less than 10 times the height of a stack element from fuel cells providing heat to the integrated stage. For example, an integrated endothermic reaction stage (such as a reforming stage) can be positioned less than 10 times the height of a stack element from any fuel cells that are heat integrated, or less than 8 times the height of a stack element, or less than 5 times the height of a stack element, or less than 3 times the height of a stack element. In this discussion, an integrated reforming stage and/or integrated endothermic reaction stage that represents an adjacent stack element to a fuel cell element is defined as being about one stack element height or less away from the adjacent fuel cell element.

A thermal ratio of about 1.3 or less, or about 1.15 or less, or about 1.0 or less, or about 0.95 or less, or about 0.90 or less, or about 0.85 or less, or about 0.80 or less, or about 0.75 of less, can be lower than the thermal ratio typically sought in use of MCFC fuel cells. In aspects of the invention, the thermal ratio can be reduced to increase and/or optimize syngas generation, hydrogen generation, generation of another product via an endothermic reaction, or a combination thereof.

In various aspects of the invention, the operation of the fuel cells can be characterized based on a thermal ratio. Where fuel cells are operated to have a desired thermal ratio, a molten carbonate fuel cell can be operated to have a thermal ratio of about 1.5 or less, for example about 1.3 or less, or about 1.15 or less, or about 1.0 or less, or about 0.95 or less, or about 0.90 or less, or about 0.85 or less, or about 0.80 or less, or about 0.75 or less. Additionally or alternately, the thermal ratio can be at least about 0.25, or at least about 0.35, or at least about 0.45, or at least about 0.50. Further additionally or alternately, in some aspects the fuel cell can be operated to have a temperature rise between anode input and anode output of about 40° C. or less, such as about 20° C. or less, or about 10° C. or less. Still further additionally or alternately, the fuel cell can be operated to have an anode outlet temperature that is from about 10° C. lower to about 10° C. higher than the temperature of the anode inlet. Yet further additionally or alternately, the fuel cell can be operated to have an anode inlet temperature greater than the anode outlet temperature, such as at least about 5° C. greater, or at least about 10° C. greater, or at least about 20° C. greater, or at least about 25° C. greater. Still further additionally or alternately, the fuel cell can be operated to have an anode inlet temperature greater than the anode outlet temperature by about 100° C. or less, or about 80° C. or less, or about 60° C. or less, or about 50° C. or less, or about 40° C. or less, or about 30° C. or less, or about 20° C. or less.

Operating a fuel cell with a thermal ratio of less than 1 can cause a temperature drop across the fuel cell. In some aspects, the amount of reforming and/or other endothermic reaction may be limited so that a temperature drop from the anode inlet to the anode outlet can be about 100° C. or less, such as about 80° C. or less, or about 60° C. or less, or about 50° C. or less, or about 40° C. or less, or about 30° C. or less, or about 20° C. or less. Limiting the temperature drop from the anode inlet to the anode outlet can be beneficial, for example, for maintaining a sufficient temperature to allow complete or substantially complete conversion of fuels (by reforming) in the anode. In other aspects, additional heat can be supplied to the fuel cell (such as by heat exchange or combustion of additional fuel) so that the anode inlet temperature is greater than the anode outlet temperature by less than about 100° C. or less, such as about 80° C. or less, or about 60° C. or less, or about 50° C. or less, or about 40° C. or less, or about 30° C. or less, or about 20° C. or less, due to a balancing of the heat consumed by the endothermic reaction and the additional external heat supplied to the fuel cell.

The amount of reforming can additionally or alternately be dependent on the availability of a reformable fuel. For example, if the fuel only comprised $H_2$, no reformation would occur because $H_2$ is already reformed and is not further reformable. The amount of "syngas produced" by a fuel cell can be defined as a difference in the lower heating value (LHV) value of syngas in the anode input versus an LVH value of syngas in the anode output. Syngas produced LHV (sg net)=(LHV(sg out)−LHV(sg in)), where LHV(sg in) and LHV(sg out) refer to the LHV of the syngas in the anode inlet and syngas in the anode outlet streams or flows, respectively. A fuel cell provided with a fuel containing substantial amounts of $H_2$ can be limited in the amount of potential syngas production, since the fuel contains substantial amounts of already reformed $H_2$, as opposed to containing additional reformable fuel. The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode.

An example of a method for operating a fuel cell with a reduced thermal ratio can be a method where excess reforming of fuel is performed in order to balance the generation and consumption of heat in the fuel cell and/or consume more heat than is generated. Reforming a reformable fuel to form $H_2$ and/or CO can be an endothermic process, while the anode electrochemical oxidation reaction and the cathode combustion reaction(s) can be exothermic. During conventional fuel cell operation, the amount of reforming needed to supply the feed components for fuel cell operation can typically consume less heat than the amount of heat generated by the anode oxidation reaction. For example, conventional operation at a fuel utilization of about 70% or about 75% produces a thermal ratio substantially greater than 1, such as a thermal ratio of at least about 1.4 or greater, or 1.5 or greater. As a result, the output streams for the fuel cell can be hotter than the input streams. Instead of this type of conventional operation, the amount of fuel reformed in the reforming stages associated with the anode can be increased. For example, additional fuel can be reformed so that the heat generated by the exothermic fuel cell reactions can either be (roughly) balanced by the heat consumed in reforming and/or consume more heat than is generated. This can result in a substantial excess of hydrogen relative to the amount oxidized in the anode for electrical power generation and result in a thermal ratio of about 1.0 or less, such as about 0.95 or less, or about 0.90 or less, or about 0.85 or less, or about 0.80 or less, or about 0.75 or less.

In some aspects, the reformable hydrogen content of reformable fuel in the input stream delivered to the anode and/or to a reforming stage associated with the anode can be at least about 50% greater than the net amount of hydrogen reacted at the anode, such as at least about 75% greater or at least about 100% greater. Additionally or alternately, the reformable hydrogen content of fuel in the input stream delivered to the anode and/or to a reforming stage associated with the anode can be at least about 50% greater than the net amount of hydrogen reacted at the anode, such as at least about 75% greater or at least about 100% greater. In various aspects, a ratio of the reformable hydrogen content of the reformable fuel in the fuel stream relative to an amount of hydrogen reacted in the anode can be at least about 1.5:1, or at least about 2.0:1, or at least about 2.5:1, or at least about 3.0:1. Additionally or alternately, the ratio of reformable hydrogen content of the reformable fuel in the fuel stream relative to the amount of hydrogen reacted in the anode can be about 20:1 or less, such as about 15:1 or less or about 10:1 or less. In one aspect, it is contemplated that less than 100% of the reformable hydrogen content in the anode inlet stream can be converted to hydrogen. For example, at least about 80% of the reformable hydrogen content in an anode inlet stream can be converted to hydrogen in the anode and/or in an associated reforming stage(s), such as at least about 85%, or at least about 90%. Additionally or alternately, the amount of reformable fuel delivered to the anode can be characterized based on the Lower Heating Value (LHV) of the reformable fuel relative to the LHV of the hydrogen oxidized in the anode. This can be referred to as a reformable fuel surplus ratio. In various aspects, the reformable fuel surplus ratio can be at least about 2.0, such as at least about 2.5, or at least about 3.0, or at least about 4.0. Additionally or alternately, the reformable fuel surplus ratio can be about 25.0 or less, such as about 20.0 or less, or about 15.0 or less, or about 10.0 or less.

Example—Operation of Integrated Gas Turbine, MCFCs. And Chemical Looping Combustion for Load Following Simulations were performed to model electrical power production over the course of a 24 hour period using a natural gas combined cycle power plant with integrated molten carbonate fuel cells for $CO_2$ capture and chemical looping combustion reactors for processing of the anode output stream. The simulated configuration was similar to the configuration shown in FIG. 5. In the simulations, the power plant was operated to model a "load following" strategy, where the demand for electrical power has a peak region, such as a peak region that could correspond to the middle of the day. In the simulations, the natural gas turbine and the molten carbonate fuel cells were operated at steady state. The molten carbonate fuel cells were operated to have a $CO_2$ utilization of roughly 80%. Variations in total electrical power output from the power plant were provided based on the operation of the chemical looping combustion reactors. During low load time periods, the chemical looping combustion reactors were operated to only perform oxidation of the anode output stream. As the demand or load for electricity increased, regeneration of the initial metal oxide was performed, in order to generate heat for a heat recovery steam generator.

Figure 6:
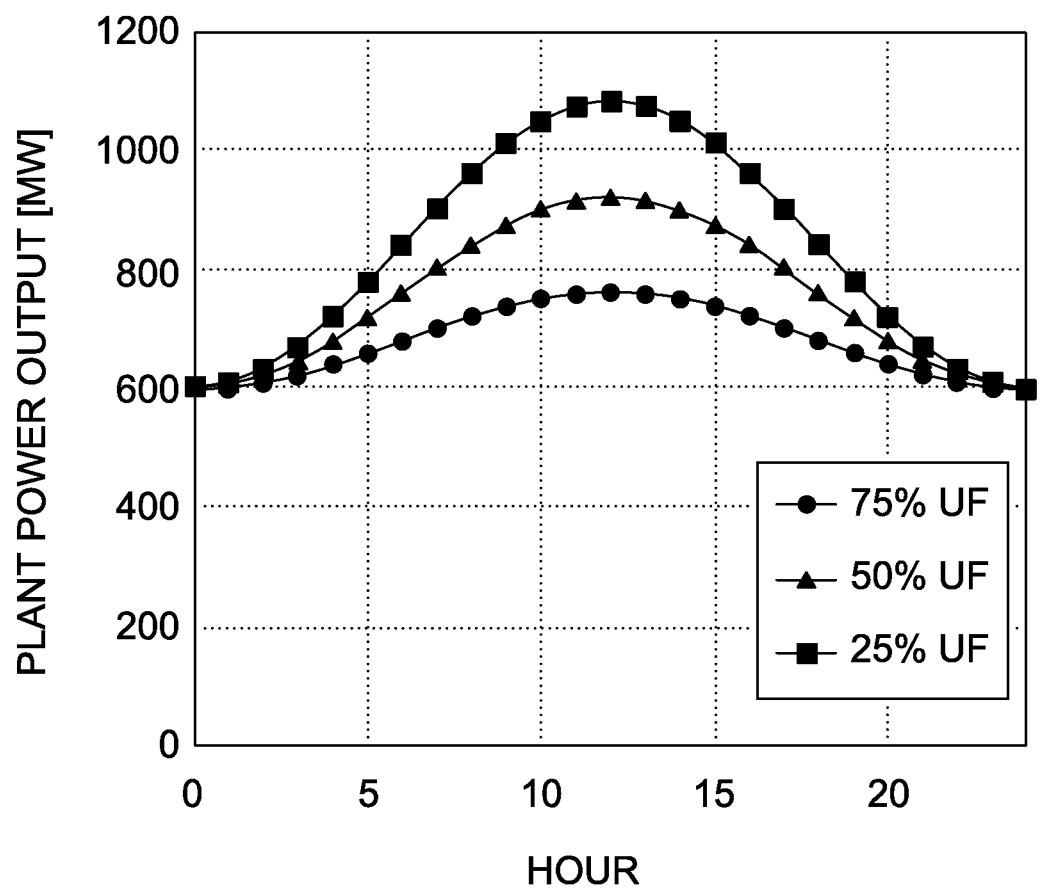
FIG. 6 shows simulated load following examples at various levels of fuel utilization within molten carbonate fuel cells.

FIG. 6 shows simulation results from operating the molten carbonate fuel cells at three different levels of fuel utilization. As shown in FIG. 6, by varying the fuel utilization, the amount of energy stored in the form of reduced metal can be increased, thus allowing for greater variations in electrical power production from the baseline amount over time. The simulation results shown in FIG. 6 demonstrate that significant load following flexibility can be achieved based on the ability to operate the molten carbonate fuel cells at different levels of fuel utilization.

ADDITIONAL EMBODIMENTS

Embodiment 1

A method for producing electricity using a molten carbonate fuel cell comprising an anode and a cathode, the method comprising: operating the molten carbonate fuel cell with a cathode input stream comprising $CO_2$ and $O_2$ to generate i) electricity at a current density of 60 mA/cm$^2$ or more, ii) an anode exhaust comprising $H_2$, CO, and $CO_2$, and iii) a cathode exhaust comprising 2.0 vol % or less $CO_2$, 1.0 vol % or more $H_2O$, and 1.0 vol % or more $O_2$, and oxidizing at least a portion of the $H_2$ and CO in the anode exhaust in the presence of a metal oxide oxidizer.

Embodiment 2

The method of Embodiment 1, wherein at least a portion of the metal oxide oxidizer is converted into metal, a reduced oxidation state metal oxide, or a combination thereof, the method further comprising oxidizing at least a portion of the converted metal, reduced oxidation state metal oxide, or a combination thereof to form the metal oxide oxidizer, and wherein the cathode exhaust optionally further comprising $O_2$, the at least a portion of the converted metal, reduced oxidation state metal oxide, or a combination thereof optionally being oxidized using at least a portion of the cathode exhaust.

Embodiment 3

The method of Embodiment 2, wherein oxidizing the converted metal, reduced oxidation state metal oxide, or a combination thereof to the metal oxide oxidizer generates heat, the generated heat being used for generation of electrical power, the generated heat optionally being used to generate steam that is passed into a heat recovery steam generator.

Embodiment 4

The method of Embodiment 2 or 3, the method further comprising: determining a requested load; accumulating the metal, reduced oxidation state metal oxide, or a combination thereof when the requested load is below a threshold value; and oxidizing at least a portion of the converted metal, reduced oxidation state metal oxide, or a combination thereof to the metal oxide oxidizer when the requested load is greater than a second threshold value.

Embodiment 5

The method of any of the above embodiments, wherein the cathode input stream comprises 5.0 vol % or less $CO_2$, or wherein the cathode exhaust comprises 1.0 vol % or less $CO_2$, or a combination thereof.

Embodiment 6

The method of any of the above embodiments, wherein the molten carbonate fuel cell is operated at a transference of 0.95 or less, or wherein the molten carbonate fuel cell is operated at a $CO_2$ utilization of 75% or more, or a combination thereof.

Embodiment 7

The method of any of the above embodiments, wherein the voltage drop across the cathode is 0.4 V or less, or wherein the electricity is generated at a voltage of 0.55 V or more, or a combination thereof.

Embodiment 8

The method of any of the above embodiments, wherein a $H_2$ concentration in the anode exhaust is 5.0 vol % or more, or wherein a combined concentration of $H_2$ and CO in the anode is exhaust is 6.0 vol % or more, or a combination thereof.

Embodiment 9

The method of any of the above embodiments, wherein the metal oxide oxidizer comprises iron oxide, manganese oxide, nickel oxide, copper oxide, or a combination thereof.

Embodiment 10

The method of any of the above embodiments, wherein the at least a portion of the $H_2$ and CO in the anode exhaust is oxidized in the presence of a fixed bed comprising the metal oxide oxidizer, a fluidized bed comprising the metal oxide oxidizer, or a combination thereof.

Embodiment 11

A combined cycle power system, comprising: a gas turbine comprising a combustion zone, and a turbine outlet; a plurality of molten carbonate fuel cells comprising fuel cell cathodes, fuel cell anodes, a cathode exhaust outlet, and an anode exhaust outlet, the fuel cell cathodes being in fluid communication with the combustion zone via the turbine outlet; a plurality of chemical looping combustion reactors including one or more first reactors comprising metal oxide particles and one or more second reactors comprising reduced oxidation state metal oxide particles, metal particles, or a combination thereof, at least one first reactor being in fluid communication with the anode exhaust outlet; and a heat recovery steam generator in fluid communication with at least one second reactor.

Embodiment 12

The combined cycle power system of Embodiment 11, further comprising a second heat recovery steam generator in fluid communication with an outlet of the at least one first reactor.

Embodiment 13

The combined cycle power system of Embodiment 11 or 12, further comprising a third heat recovery steam generator, the fuel cell cathodes being in fluid communication with the combustion zone via the turbine outlet and via the third heat recovery steam generator.

Embodiment 14

The combined cycle power system of any of Embodiments 11 to 13, wherein the metal oxide comprises iron oxide, manganese oxide, nickel oxide, copper oxide, or a combination thereof.

Embodiment 15

The combined cycle power system of any of Embodiments 11 to 14, wherein the plurality of chemical looping combustion reactors comprise fixed bed reactors, fluidized bed reactors, or a combination thereof.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for producing electricity using a molten carbonate fuel cell comprising an anode and a cathode, the method comprising:
    operating the molten carbonate fuel cell with a cathode input stream comprising $CO_2$ and $O_2$ to generate i) electricity at a current density of 60 mA/cm$^2$ or more, ii) an anode exhaust comprising $H_2$, CO, and $CO_2$, and iii) a cathode exhaust comprising 2.0 vol % or less $CO_2$, 1.0 vol % or more $H_2O$, and 1.0 vol % or more $O_2$; and
    oxidizing at least a portion of the $H_2$ and CO in the anode exhaust in the presence of a metal oxide oxidizer,
    wherein the molten carbonate fuel cell is operated at a transference of 0.95 or less.

2. The method of claim 1, wherein at least a portion of the metal oxide oxidizer is converted into metal, a reduced oxidation state metal oxide, or a combination thereof, the method further comprising oxidizing at least a portion of the converted metal, reduced oxidation state metal oxide, or a combination thereof to form the metal oxide oxidizer.

3. The method of claim 2, wherein oxidizing the converted metal, reduced oxidation state metal oxide, or a combination thereof to the metal oxide oxidizer generates heat, the generated heat being used for generation of electrical power.

4. The method of claim 3, wherein the generated heat is used to generate steam, the method further comprising passing the generated steam into a heat recovery steam generator.

5. The method of claim 2, the method further comprising:
    determining a requested load;
    accumulating the metal, reduced oxidation state metal oxide, or a combination thereof when the requested load is below a threshold value; and
    oxidizing at least a portion of the converted metal, reduced oxidation state metal oxide, or a combination thereof to the metal oxide oxidizer when the requested load is greater than a second threshold value.

6. The method of claim 2, the at least a portion of the converted metal, reduced oxidation state metal oxide, or a combination thereof being oxidized using at least a portion of the cathode exhaust.

7. The method of claim 1, wherein the cathode input stream comprises 5.0 vol % or less $CO_2$, or wherein the cathode exhaust comprises 1.0 vol % or less $CO_2$, or a combination thereof.

8. The method of claim 1, wherein the molten carbonate fuel cell is operated at a $CO_2$ utilization of 75% or more.

9. The method of claim 1, wherein the voltage drop across the cathode is 0.4 V or less, or wherein the electricity is generated at a voltage of 0.55 V or more, or a combination thereof.

10. The method of claim 1, wherein a $H_2$ concentration in the anode exhaust is 5.0 vol % or more, or wherein a combined concentration of $H_2$ and CO in the anode is exhaust is 6.0 vol % or more, or a combination thereof.

11. The method of claim 1, wherein the metal oxide oxidizer comprises iron oxide, manganese oxide, nickel oxide, copper oxide, or a combination thereof.

12. The method of claim 1, wherein the at least a portion of the $H_2$ and CO in the anode exhaust is oxidized in the presence of a fixed bed comprising the metal oxide oxidizer.

13. The method of claim 1, wherein the at least a portion of the $H_2$ and CO in the anode exhaust is oxidized in the presence of a fluidized bed comprising the metal oxide oxidizer.

14. A method for producing electricity using a molten carbonate fuel cell comprising an anode and a cathode, the method comprising:
    operating the molten carbonate fuel cell with a cathode input stream comprising $CO_2$, $O_2$, and 2.0 vol % or more of $H_2O$ to generate i) electricity at a current density of 120 mA/cm$^2$ or more, ii) an anode exhaust comprising 5.0 vol % or more $H_2$, the anode exhaust further comprising $CH_4$, CO, and $CO_2$, and iii) a cathode exhaust comprising 1.0 vol % or less $CO_2$, 2.0 vol % or more $H_2O$, and 1.0 vol % or more $O_2$; and
    oxidizing at least a portion of the $H_2$, $CH_4$, and CO in the anode exhaust in the presence of a metal oxide oxidizer,
    wherein the molten carbonate fuel cell is operated at a transference of 0.95 or less.

15. A method for producing electricity using a molten carbonate fuel cell comprising an anode and a cathode, the method comprising:
    operating the molten carbonate fuel cell with a cathode input stream comprising $CO_2$, $O_2$, and 2.0 vol % or more of $H_2O$ to generate i) electricity at a current density of 120 mA/cm$^2$ or more, ii) an anode exhaust comprising 5.0 vol % or more $H_2$, the anode exhaust further comprising CO, and $CO_2$, and iii) a cathode exhaust comprising 1.0 vol % or less $CO_2$, 2.0 vol % or more $H_2O$, and 1.0 vol % or more $O_2$; and
    oxidizing at least a portion of the $H_2$ and CO in the anode exhaust in the presence of a metal oxide oxidizer,
    wherein the molten carbonate fuel cell is operated at a transference of 0.95 or less,
    wherein at least a portion of the metal oxide oxidizer is converted into metal, a reduced oxidation state metal oxide, or a combination thereof, the method further comprising oxidizing at least a portion of the converted metal, reduced oxidation state metal oxide, or a combination thereof to form the metal oxide oxidizer, and
    wherein the at least a portion of the converted metal, reduced oxidation state metal oxide, or a combination thereof is oxidized using $O_2$ from at least a portion of the cathode exhaust.

* * * * *